Jan. 30, 1968  H. SCHENK  3,365,923
DEVICE FOR PRODUCING A UNIFORM PRESSURE FOR
THE DEEP-DRAWING OF METAL WORKPIECES
Filed Sept. 15, 1965
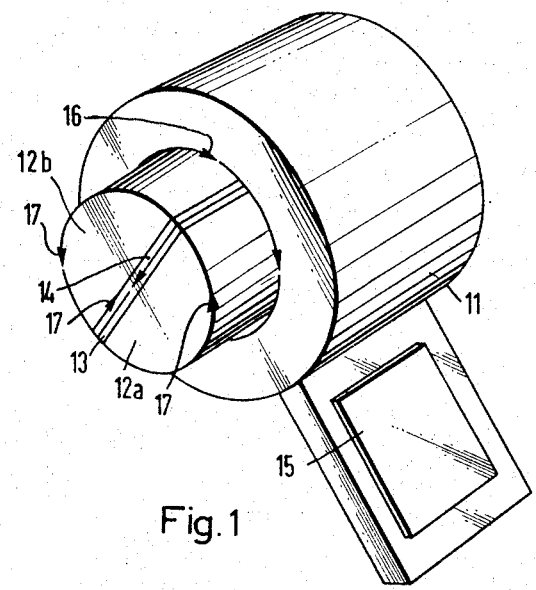
Fig. 1
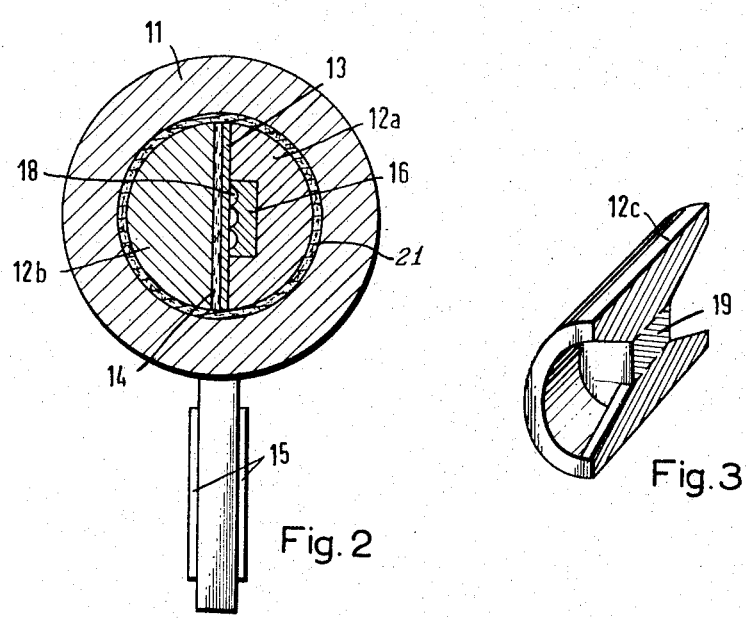
Fig. 2
Fig. 3

United States Patent Office 3,365,923
Patented Jan. 30, 1968

3,365,923
DEVICE FOR PRODUCING A UNIFORM PRESSURE FOR THE DEEP-DRAWING OF METAL WORKPIECES
Horst Schenk, Erlangen, Germany, assignor to Siemens Schuckertwerke Aktiengesellschaft, Berlin, and Erlangen, Germany, a corporation of Germany
Filed Sept. 15, 1965, Ser. No. 487,456
Claims priority, application Germany, Sept. 19, 1964, S 93,242
5 Claims. (Cl. 72—56)

ABSTRACT OF THE DISCLOSURE

Device for producing a uniform pressure for the deep-drawing of metal workpieces by pulsed magnetic fields includes an air core compression coil adapted to be electrically connected to a current pulse supply source, a field concentrator received within the interior of the coil, the field concentrator having a plurality of discrete parts with opposing flat surfaces, an insulating layer on the opposing surface of one of the parts, the insulating layer and the opposing surface of the other of the parts defining a planar gap therebetween for receiving a flat workpiece therein whereby the workpiece is insulated from the opposing surface of one of the parts and in good electrical contact with the opposing surface of the other of the parts, and a space extending into the last named part from the last named surface which is contoured to receive exchangeable dies therein.

Specification

My invention relates to devices for producing workpieces by magnetic pulse forming techniques. More particularly, it relates to such a device which enables the deep-drawing of metal workpieces.

In recent years, many new techniques have been evolved in the field of metal workpiece formation which permit of much greater forming speeds than do conventional methods. These new techniques are generally referred to as "high-speed" forming methods and among them is included the method of forming by magnetic pulsing.

The latter magnetic pulse forming method and a suitable arrangement which may be utilized for carrying out such method is described in U.S. Patent No. 2,976,907, of G. W. Harvey et al., for "Metal Forming Device and Method," dated March 28, 1961. Such magnetic forming method is based upon the fact that a variable magnetic field may be caused to exert a pressure upon a metal surface. Thus, an axially directed pulsating magnetic field resulting from the discharge of a high voltage capacitor is built up, for example, in an air core coil containing therein a metal workpiece which is to be formed into a chosen configuration. Such pulsating magnetic field causes the generation of a peripheral eddy current within the workpiece. Because of the skin effect, the aforesaid eddy current path is confined to the outer skin of the workpiece provided that the frequency of the tuned circuit formed by the air core coil, and the aforesaid capacitor, and the electrical conductivity are respectively of sufficiently high values. In such situation, the inner cross section, i.e., the interior of a hollow workpiece, is then essentially field-free whereby the pulsating magnetic field is concentrated in the gap between the coil and the workpiece.

The magnetic pulse process of workpiece forming enables the ready forming of metal blanks into desired shapes with the aid of large pulsed magnetic fields. In such process, for example, cylindrical workpiece blanks may be compressed with the employment of compression coils and may be expanded using expansion coils. A so-called flat coil whose winding consists of a planar spiral may be utilized for the deep-drawing of metal sheets. Such deep-drawing is disclosed in the co-pending U.S. patent application of Horst Schenk and Helmut Seiffert for "Device for Forming Metallic Workpieces by Pulsed Magnetic Fields," SN 469,184, filed July 2, 1965.

Although the use of flat coils to enable the deep-drawing of metallic sheets in a pulsed magnetic field forming method has been shown to be quite efficacious for its purpose, the flat coils heretofore used do present a disadvantage in that the pressure exerted upon a workpiece to be formed by the known flat coil has a minimum pressure point at its center. Such pressure minimum results from the fact that no eddy current flows in the metal sheet across the center of the spiral and that only a partial component of the magnetic field is oriented perpendicularly to the flow path of the eddy current. Because of the consequent uneven distribution of pressure, flat, i.e., metal sheet, workpieces either cannot be formed at their center or, at least, are formed poorly and unsatisfactorily thereat.

Accordingly, it is an important object of this invention to provide a device for producing a substantially uniform deep-drawing pressure for the deep-drawing of metal workpieces, particularly metal plates and sheets, by pulsed magnetic fields which are produced in operating coils and in which the distribution of pressure is substantially uniform.

This object is attained by providing a compression coil, i.e., the operating coil, which contains therein a field concentrator constructed of two discrete parts. The field concentrator is arranged inside the compression coil such that the workpiece is disposed between the parts of the field concentrator. The active area of one of the aforesaid parts of the field concentrator is electrically insulated and the active area of the other part of the field concentrator is provided with an exchangeable die. By the term "active area" it is intended to signify that area in which generated eddy currents are concentrated. This area generally corresponds to the product of the height and the inner diameter of the operating, i.e., compression, coil.

With the device according to the invention, there is enabled the obtaining of a substantially uniform pressure distribution in the deep-drawing of metal sheets by converting the cylindrically, i.e., radially, symmetrical field of a compression coil into a flat field with the aid of appropriate field concentrators. In this connection, it has been found to be particularly advantageous to construct the field concentrator to comprise two symmetrical parts, such as two semicylindrical halves, for example.

The technological advantage presented by the device made according to the invention, as compared to known devices, results from the fact that there is insured a uniform pressure distribution upon flat workpieces such as metal sheets and that, thereby, an even workpiece forming is achieved. In addition, a substantial improvement in the precise adjustment to the size of the workpiece is enabled when a compression coil is utilized which employs field concentrators.

Generally speaking and in accordance with the invention, there is provided a device for the deep-drawing of metal workpieces by pulsed magnetic fields. The device includes an air core compression coil adapted to be electrically connected to a current pulse supply source, and a field concentrator contained within the interior of the coil. The field concentrator comprises a pair of discrete parts with opposing flat surfaces, an insulating layer being provided on the opposing surface of one of the parts, the insulating surface and the opposing surface of the other of the parts defining a planar gap therebetween for receiving a flat workpiece therein whereby the workpiece is insulated from one of the opposing surfaces and is in good electrical contact with the other of the opposing surfaces. A space which extends from the good electrical contact surface into the interior of the field concentrator part having this surface is provided and is contoured to receive exchangeable dies therein.

The foregoing and more specific objects and features of my invention will be apparent from and will be mentioned in the following description of a device for producing a uniform pressure for the deep-drawing of metal workpieces according to the invention taken in conjunction with the accompanying drawing.

In the drawing, FIG. 1 is a three-dimensional depiction of a device constructed in accordance with the principles of the invention;

FIG. 2 is a partly cross-sectional view of the device of FIG. 1; and

FIG. 3 is a three-dimensional view of a variation in the structure of a component part of the field concentrator included in the inventive device.

Referring now to FIG. 1 wherein there is shown a device for producing a substantially uniform deep-drawing pressure constructed in accordance with the principles of the invention, a hollow air core cylindrical compression coil 11 which is adapted to have applied thereto the electric pulse for generating the magnetic pulse effecting the deep-drawing, snugly receives in its interior, a field concentrator 12. Field concentrator 12 is of cylindrical configuration and comprises two symmetrical halves 12a and 12b. Disposed along the diametric sides of halves 12a and 12b along the length of field concentrator 12 are a workpiece 13 comprising a metallic sheet and an insulating layer 14 as shown. The structure designated with the numeral 15 depicts a terminal strip. The direction of the supply current flow in compression coil 11 is indicated by arrows 16 and the directions of the respective eddy currents generated in the respective peripheries of halves 12a and 12b are indicated by arrows 17.

As seen in FIG. 1, workpiece 13, which is a planar metal sheet, is disposed in the diametric gap between field concentrator halves 12a and 12b, half 12b being insulated from workpiece 13 by insulating layer 14 and half 12a having good electrical contact with workpiece 13.

In the operation of the arrangement of FIG. 1, by having the planar workpiece disposed in the gap between the diametric opposing surfaces of halves 12a and 12b of field concentrator 12 and by having the workpiece in good electrical contact with one diametric opposing surface and insulated from the other diametric opposing surface, the eddy currents generated on the peripheries of the halves of the field concentrator result in a relatively uniform areal pressure distribution on the workpiece. Effectively, the arrangement of FIG. 1 converts the radially symmetrical magnetic field of cylindrical compression coil 11 to a relatively planar field having the necessary magnitude and concentration.

In FIG. 2 where there is shown a view, partly in cross section of the device of FIG. 1 and wherein the same numerals are employed to designate the same structure respectively, the numerals 12a and 12b designate the semicylindrical halves of the field concentrator, numeral 13 designates the planar metal sheet which is to be formed, numeral 14 designates the insulating layer, and numeral 15 designates the terminal strip. The numeral 21 designates an insulating layer provided between the inner periphery of compression coil 11 and field concentrator 12. A workpiece forming die 18 is received in a properly contoured space provided therefor in half 12a of field concentrator 12, i.e., the semicylindrical half of the field concentrator in good electrical contact with planar metal sheet workpiece 13. Die 18 is suitably replaceable by other dies.

In FIG. 3 there is shown a semicylindrical half of a field concentrator which is suitable for use in a device according to the invention which is configured to effect a concentration of generated eddy currents to a small planar active area 19. In the embodiment shown in FIG. 3, the active area 19 is, of course, smaller than the product of the height of the field concentrator and its diameter. It is appreciated that semicylindrical field concentrator half 19a is part of a device in which there is included an opposing similarly configured semicylindrical half with an insulating layer on the diametric surface of one half and the planar metal workpiece is disposed in the gap between the insulating layer and the opposing surface of the other half.

In the device of the invention, the semicylindrical halves of the field concentrator may suitably comprise a material of relatively good electrical conductivity such as copper-beryllium, aluminum, etc. The exchangeable die 18 may suitably comprise a material such as steel, cast resin and also a material such as copper-beryllium. The material constituting the die merely need be one characterized by such strength and rigidity that the material of the sheet metal workpiece to be formed can be pressed in thereby.

It will be obvious to those skilled in the art upon studying this disclosure that devices for producing a uniform deep-drawing pressure for the deep-drawing of planar metal workpieces by pulsed magnetic fields according to my invention permit of a great variety of modifications and hence can be given embodiments other than those particularly illustrated herein without departing from the essential features of my invention and within the scope of the claims annexed hereto.

I claim:

1. A device for producing a uniform pressure for the deep-drawing of metal workpieces by pulsed magnetic fields comprising an air core compression coil adapted to be electrically connected to a current pulse supply source, a field concentrator received within the interior of said coil, said field concentrator comprising a plurality of discrete parts with opposing flat surfaces, an insulating layer on said opposing surface of one of said parts, said insulating layer and said opposing surface of the other of said parts defining a planar gap therebetween for receiving a flat workpiece therein whereby said workpiece is insulated from the opposing surface of one of said parts and in good electrical contact with the opposing surface of the other of said parts, and a space extending into said last named part from said last named surface which is contoured to receive exchangeable dies therein.

2. A device as defined in claim 1 wherein said interior of said compression coil is of right circular cylindrical configuration, wherein said field concentrator has a cylindrical shape substantially corresponding to the configuration of said interior and comprises a pair of semicylindrical halves, the diametric surfaces of said halves being in opposed relationship, whereby upon the generation of a magnetic pulse resulting from the current pulsing of said coil, peripheral eddy currents are respectively generated on the surfaces of said halves to provide active areas on said surfaces.

3. A device as defined in claim 2 wherein the areas respectively of said diametric opposing surfaces are substantially equal to the product of the height of said field concentrator and its diameter whereby said active area is substantially equal to said product.

4. A device as defined in claim 2 wherein the areas respectively of said diametric opposing surfaces are less than the product of the height of said field concentrator and whereby said active area is correspondingly less than said product.

5. A device as defined in claim 2 and further including an insulating layer intermediate the interior cylindrical surface of said compression coil and the outer cylindrical surface of said field concentrator.

References Cited

UNITED STATES PATENTS

| | | | |
|---|---|---|---|
| 2,976,907 | 3/1961 | Harvey et al. | 72—56 |
| 3,108,325 | 10/1963 | Harvey et al. | 72—56 |
| 3,279,228 | 10/1966 | Brower | 72—56 |

RICHARD J. HERBST, *Primary Examiner.*